United States Patent [19]

Proctor et al.

[11] Patent Number: 4,601,761
[45] Date of Patent: Jul. 22, 1986

[54] NOZZLE FOR SELF-CONTAINED CUTTING TORCHES

[75] Inventors: Paul W. Proctor, White Plains; Robert L. Dow, Laplata, both of Md.

[73] Assignee: The United States of America as represented by the Secretary of the Navy, Washington, D.C.

[21] Appl. No.: 745,738

[22] Filed: Jun. 17, 1985

[51] Int. Cl.[4] .............................................. B23K 7/00
[52] U.S. Cl. ...................................... 148/9 R; 266/48
[58] Field of Search .......................... 148/9 R; 266/48

[56] References Cited

U.S. PATENT DOCUMENTS

| 3,117,518 | 1/1964 | Porter et al. | 86/1 B |
|---|---|---|---|
| 3,656,432 | 4/1972 | Hackman | 266/48 |
| 3,713,636 | 1/1973 | Helms et al. | 266/48 |
| 3,724,372 | 4/1973 | Phillips | 86/1 B |
| 3,734,476 | 5/1973 | Holzman | 266/48 |
| 3,741,135 | 6/1973 | Thompson | 266/48 |
| 4,046,055 | 9/1977 | McDanolds et al. | 86/1 B |

Primary Examiner—Wayland Stallard
Attorney, Agent, or Firm—Kenneth E. Walden; Terry M. Gernstein

[57] ABSTRACT

A self contained jet perforator torch (10) for defining large holes (H) in a workpiece (W) such as a large bomb, includes a plurality of ports (68) fluidically connecting a combustion chamber with a slot-like chamber (62). The ports and the slot-like chamber extend at an angle with respect to the longitudinal centerline of the torch whereby fluid exiting the torch contacts a workpiece at an angle (I) with a normal (N) extending from the workpiece.

17 Claims, 5 Drawing Figures

NOZZLE FOR SELF-CONTAINED CUTTING TORCHES

BACKGROUND OF THE INVENTION

1. Technical Field

The present invention relates generally to metal cutting, and more particularly to cutting through bomb casings. Most specifically, the present invention relates to large dud ordnance.

2. Background

Dud disarmament often includes establishing a hole in the metal casing of the dud and igniting the explosive. The hole is defined to be large enough whereby the gases generated by the burning explosive are vented in a manner so the explosive burns out completely without detonation.

In the past, ITROD torches have been used to form the vent hole. However, large duds, that is bombs five hundred pounds or over, are subject to special problems which makes it difficult to use ITROD torches on these duds. For example, these large duds may become embedded and may have antidisturbance devices on them which causes them to explode if the dud is moved. Furthermore, the hole defined in the casing of these duds to burn the warhead must be of precisely controlled dimensions. If the hole is too small, the burning of the warhead will explode the bomb, yet if the hole too large, insufficient pressure will be held maintained in the bomb casing to sustain burning. In the latter case, some of the warhead will remain unburned creating further problems of disposal.

As the ITROD torches are designed for use on small devices, an individual ITROD torch will not define a hole large enough for use on large duds. Therefore several spaced apart ITROD torches must be combined to define a hole large enough to be suitable for use on large duds. However, combining ITROD torches has many problems which effectively preclude their use in such an application. For example, all of the torches must work together and each must work properly to create such a hole. If one torch does not operate as efficiently as the others, the hole may not be properly sized. If any one of the multiple ITROD torches does not work properly, the hole will be too small and the dud ordnance may explode instead of having a desired burn out. Even the very act of mounting the ITROD torches on a large dud has drawbacks. Due to the existence of the aforementioned antididturbance devices, the positioning of the ITROD torches may, itself, be dangerous. To position four or more torches increases the possibility of exploding the bomb via the antidisturbance device. Even if these ITROD torches could be properly positioned, they may not cut the bomb casing efficiently thereby requiring larger torches. The larger torches makes it more difficult to properly and safely mount them on the dud.

OBJECTS OF THE INVENTION

It is a main object of the present invention to provide a novel and improved means for defining large holes in a metal object.

It is another object of the present invention to define large holes in the casing of a bomb dud.

It is another object of the present invention to provide novel and improved means for defining a hole in the casing of a large dud.

It is another object of the present invention to provide a novel and improved means for defining a hole in the casing of a large dud in a manner which is reliable, efficient and safe.

These and other objects are achieved by a jet perforator device which efficiently defines a hole in a large bomb dud which is properly sized to burn out the warhead of such dud. The jet perforator device may have a reusable casing body which houses a pyrotechnic charge and a nozzle means. The nozzle means guides fluids generated by the burning of the pyrotechnic charge outwardly into a cookie cutter pattern and against the bomb casing at an angle thereto. The means for defining the cookie cutter pattern includes a conical slot defined in a graphite base block to define a conical plug and a plurality of ports fludically connecting the conical slot to the chamber in which the gases from the burning pyrotechnic charge are generated. The conical slot has an exit diameter corresponding to the desired hole size required for a large dud. The ports are spaced from each other a distance which permits fluids exiting from each of those ports and expanding to a 43° angle with respect to a longitudinal centerline of the port to overlap with fluid exiting from the adjacent ports which also expands at that 43° angle. The overlapped exhausts thus completely fills the conical slot. Fluid exiting the conical slot does so at an angle with respect to the normal of the workpiece whereby the fluid contacting the workpiece tends to move molten workpiece material out of the work zone.

BRIEF DESCRIPTION OF THE DRAWINGS

Other objects, advantages and novel features of the invention will become apparent from the following detailed description of the invention when considered in conjunction with the accompanying drawings wherein.

DETAILED DESCRIPTION OF THE PREFERRED EMBODIMENT

Figure 1:
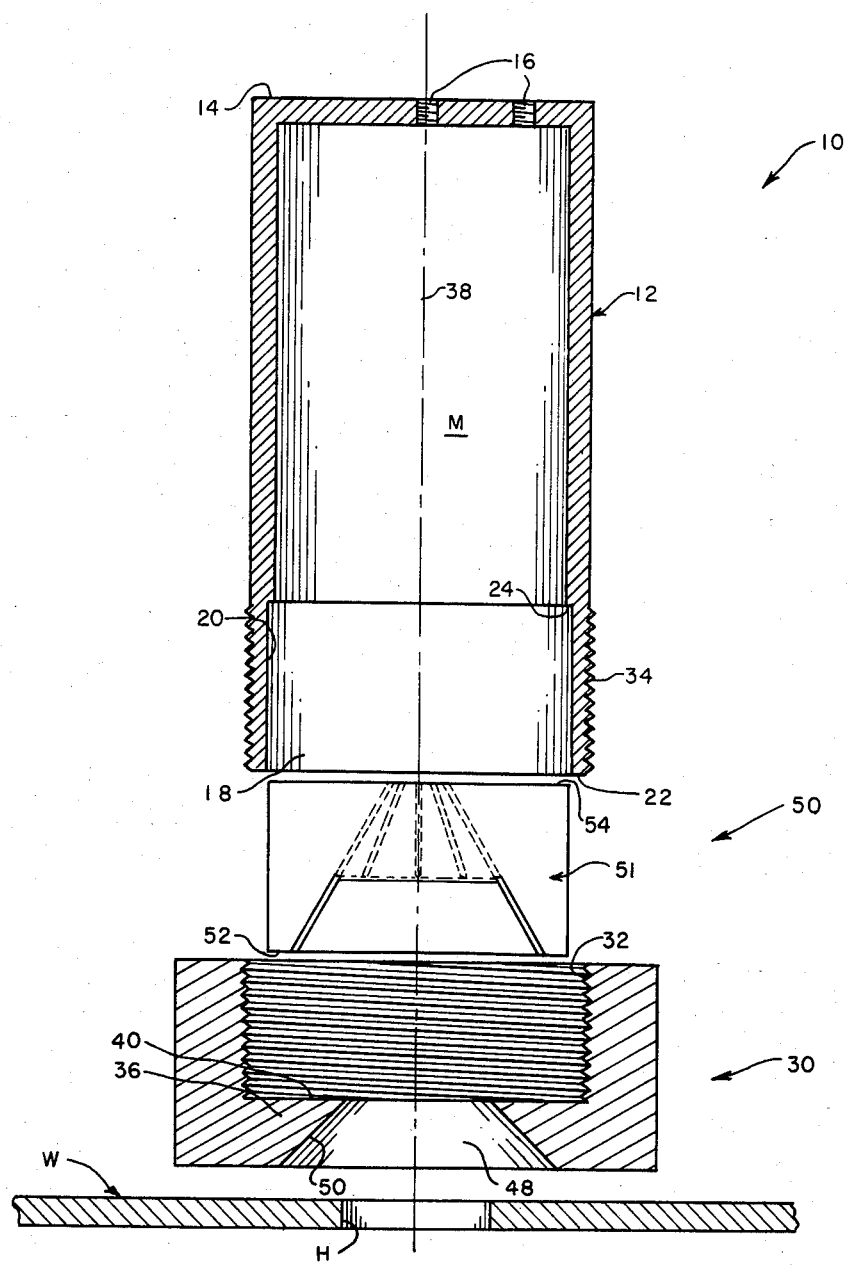
FIG. 1 is an exploded elevation view of a jet perforator device embodying the present invention.

Shown in FIG. 1 is a jet perforator device 10 which includes a reusable casing 12 for forming a large hole H in a workpiece W, such as the casing of a large dud. The casing 12 stores a pyrotechnic cutting material M, such as fluorocarbons and thermite, or the like. Combustion of material M in a combustion chamber within the casing 12 generates high temperature, high pressure fluid which is used to cut the hole H in the workpiece W. The casing is tubular and has a closed end 14 through which vent holes, such as vent holes 16, can be defined for defining a safety pressure relief means. An open end 18 includes a counterbored portion 20 extending from a rim 22 toward the closed end and forms a shoulder 24 in the inner surface of the casing. The casing is sized to contain the proper amount of charge whereby the proper cutting action occurs with the proper amount of internal pressure. A collar 30 has threads 32 for cooperable association with threads 34 located on the external surface of the casing. A flange 36 extends inwardly toward longitudinal centerline 38 of the device 10 and abuts the casing rim 22 when the collar is affixed to the casing and includes an inner surface 40 separated from an outer surface 42 by the thickness dimension of the collar. The outer surface 42 is adapted to be affixed to the workpiece W, and an exit hole 48 is defined through the flange from the inner surface 40 to the outer surface 42. The hole 48 is formed by flange end 50 which is angled to converge from outer surface 42 toward inner surface 40 of the flange. The thickness of the flange spaces the inner surface 40 from the workpiece W a distance which is predetermined to provide efficient and safe operation of the device 10.

A nozzle means 50 conducts fluid generated by combustion of the of the pyrotechnic material M against the workpiece W. The nozzle means includes a base block 51 and is adapted to be mounted in the casing 12 with a base block downstream surface 52 held on the collar flange inner surface 40 and a base block upstream surface 54 abutting the casing shoulder 24. The nozzle has means for conducting fluid to the exit hole 48 so that fluid contacts the workpiece at an angle and in a cookie cutter pattern to define a hole large enough to vent a large dud.

Figure 2:
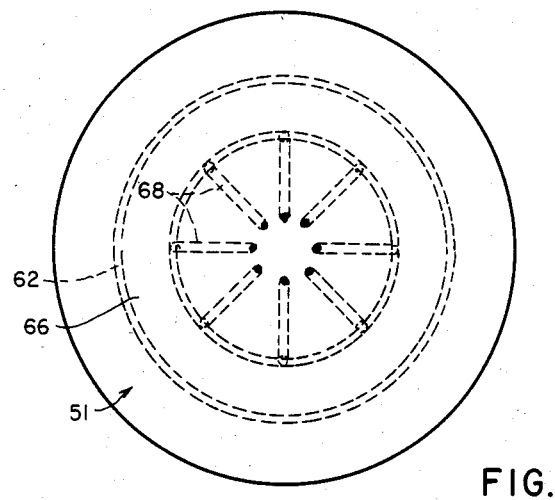
FIG. 2 is a top plan view of a nozzle unit embodying the present invention.
Figure 3:
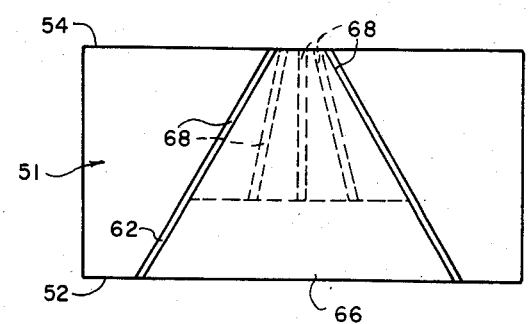
FIG. 3 is an elevation view of the nozzle unit shown in FIG. 2.

The nozzle unit is best shown in FIGS. 2 and 3 and attention is directed thereto. The nozzle unit base block is formed of material such as graphite or the like, which has the grain thereof oriented to extend transversely of the longitudinal centerline 38 of the device 10 as the block material will be strongest for such a grain orientation. A fluid path is defined by a slot-like chamber 62 formed in the base block to be conical and to extend from the outer surface 52 toward inner surface 54. The block thus has a conically shaped central plug-like section 66 located within the perimeter of the slot. The slot has a dimension at its lower perimeter adjacent to the exit hole 48 corresponding to the perimeter of the hole to be cut in the workpiece. The slot-like chamber is angled outwardly with respect to the nozzle longitudinal centerline so the fluids exiting chamber 62 do so at an angle directed radially outward of the nozzle. Such outward fluid flow moves melted workpiece material out of the work zone whereby cutting action is more effecient. The angle of incidence of the fluids against the workpiece is also adjusted so that the cut made in the workpiece is not so long as to require a great amount of pyrotechnic material to complete the operation, but not so short as to cause the fluids to enter the warhead in the casing to a depth which causes problems in properly burning that warhead material. Furthermore, if the angle of incidence is too small with respect to normal, the melted material may not properly move out of the cutting zone. It is noted that the length of a cut through the workpiece is measured from location the fluid first contacts the workpiece surface adjacent to the nozzle to the location that fluid exits the workpiece adjacent to the warhead. The ideal angle of incidence is about thirty degrees whereby the above-stated conditions are satisfied.

Another fluid path in the nozzle is defined by a plurality of ports 68 extending from block upstream surface 54 toward the block downstream surface 52 and fluidically connecting the combustion area adjacent to the material M to the slot-like chamber 62. Each of the ports extends at an angle with the longitudinal centerline of the device 10. The ports diverge away from each other as they extend from the upstream surface 54 adjacent to the combustion chamber in the casing 12, and intersect the slot-like chamber 62 at a predetermined location within the base block. The angle of the ports is adjusted to match that of the slot-like chamber 62 to prevent forming discontinuities in the flow path from the gas combustion chamber to the exit hole 48. The base block material between the ports is unitary with the central section 66 whereby that central section is securely held in the nozzle and the size of the chamber 62 is maintained uniform throughout the extent of that chamber. Fluid entering the ports at the upstream surface 54 is thus directed toward the downstream surface 52 and away from the device centerline through the ports and by the slot-like chamber 62 and finally exits the nozzle at the downstream surface 52.

The fluid exiting the ports 68 does not expand in a cone that is characteristic of a high gas to liquid ratio exhaust product leaving a rocket nozzle. Instead it expands in a fan shape having a width characteristic of the smallest nozzle size through which the jet will reproducably flow. This fanlike expansion has a characteristic angle of 43 degrees with respect to vertical and can be used to cause fluid exiting adjacent parts to intermix in the slot-like chamber 62 thereby forming a mass of high temperature fluid which is essentially continuous throughout the perimeter of the slot-like chamber 62. This continuous mass of fluid is applied to the workpiece from the slot-like chamber and thereby has a diameter equal to the desired hole size when that fluid contacts the workpiece.

It has been found that the 43 degree expansion angle is constant for the ports of the jet perforator device 10. Therefore, the spacing between adjacent ports can be set to take advantage of this characteristic. Furthermore, fluid mechanics dictates the pressures associated with the ports so that port size can be used to establish pressure in the combustion chamber adjacent to nozzle upstream surface 54. This pressure can be set without affecting the spacing of the ports due to the just mentioned constant fan angle. Therefore, port cross sectional size, within limits, can be used to control pressure in the casing 12. It has been found that the ideal pressure for the casing combustion chamber is between 1800 and 2800 psig; and the ideal port diameter has been found to be about 0.072 inches. Such a port diameter will establish the proper flow through the nozzle while also establishing the proper combustion chamber pressure. Furthermore, it has been found that the most effecient operation occurs when the diameters of the ports 68 are equal to the width of the slot-like chamber 62 as measured between the nozzle base block 51 and the plug 66.

Figure 4:
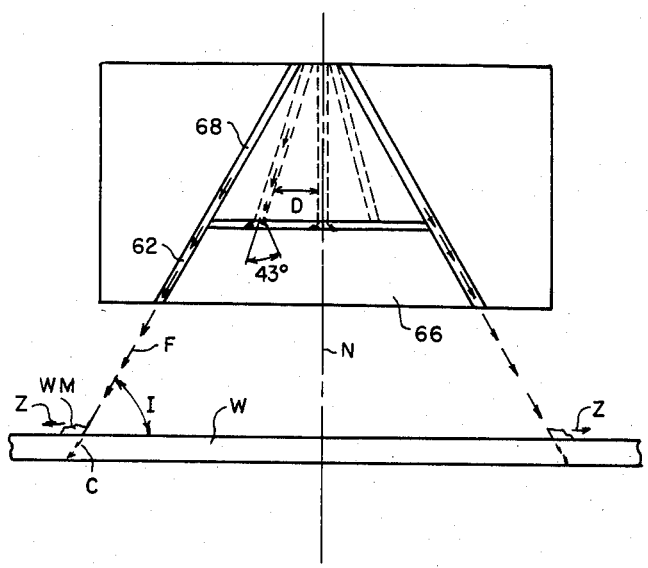
FIG. 4 is a schematic representation of the cookie cutter pattern and the 43° exhaust angle of the jet perforator nozzle means of the present invention.

The cookie cutter effect is indicated in FIG. 4 wherein the high temperature, high pressure gas exits the nozzle in the form of a hollow cone as indicated by arrows F. Intersection of this hollow cone with the planar workpiece W defines a circle with cut C being defined at an angle with normal N of the workpiece. The angle of incidence I between the fluid and the workpiece is about thirty degrees so the melted metal WM is biased to move away from the zone of contact as indicated by arrows Z. The angle of incidence is also adjusted so that the cut C is the proper length. Also shown in FIG. 4 is the fan angle of 43° of the fluid exiting the ports 68. Adjacent ports are spaced apart a distance D set so that this fan angle causes the fluid exiting these adjacent ports to combine in the chamber 62 so the intersection between the conical fluid F and the workpiece produces a continuous perimeter.

The plug-like section 66 can be used as a safety valve for the casing 12. If the base block is formed of material having reproducable strength characteristics, the section 66 can be designed to blow out when the upstream pressure exerted thereon at surface 54 exceeds a predetermined value. Such plug blow-out creates a large area opening that causes the pressure to drop rapidly and burning ceases.

Figure 5:
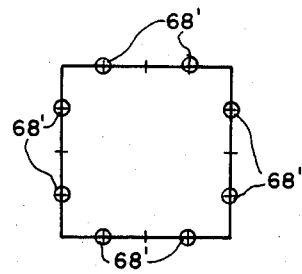
FIG. 5 is a schematic of a polygonal cutting pattern established by the jet perforator of the present invention.

While a circular configuration is shown in FIG. 2 for the ports, any polygonal configuration of three or more sides can be used for the cookie cutter pattern. One such pattern is indicated in FIG. 5. A preferred pattern will have two ports 68 per polygon side, so that, for example, the four sided polygon shown will include eight ports. To be most efficient, the spacing between adjacent ports is not uniform. As shown in FIG. 5, the spacing is such that the distance between one side and a first port is ¼ of the length of the side and the distance between adjacent ports on that side is equal to ½ of the side length. The distance from the last mentioned port and the next side is then ¼ of the length of the side. However, if the 43 degree expansion cones exiting adjacent ports will intersect, one port per side will be sufficient to create the continuous sheet of fluid exiting the chamber 62 and to cut through the workpiece in a continuous cut. The number of ports can be varied as long as the pressure within the casing 12 is kept stable and below failure limits. The number of ports can also be varied as long as the size of the ports exceeds the minimum diameter at which plugging occurs. The nozzle base block can be any grade of graphite, however, a higher density, pressed graphite with a low erosion rate is preferred. While a jam fitting of the nozzle unit between the casing shoulder 24 and the collar flange 36 has been disclosed, any other means of mounting the nozzle unit can be used as long as the molten cutting fluid does not leak around the nozzle unit.

INDUSTRIAL APPLICABILITY

While the device 10 has been disclosed in conjunction with EOD applications, it can be used anywhere a large hole is to be defined in a workpiece. It is suitable for underwater application as well. The nozzle has a safety feature in that even if inserted backwards, that is with the surface 52 located adjacent to the material M and the surface 54 located adjacent to the workpiece, the device will still function, albeit less effeciently than if the nozzle were properly oriented. Because of the reduced hazzards associated with the use of the device 10 and the safety value features thereof, it has a variety of applications.

Obviously many modications and variations of the present invention are possible in light of the above teachings. It is therefore to be understood that within the scope of the appended claims the invention may be practiced otherwise than as specifically described.

What is claimed as new and desired to be secured by Letters Patent of the United States is:

1. A self contained torch for forming large holes in a workpiece, comprising:
   a storage means for storing pyrotechnic material;
   a nozzle means for conducting fluid generated by combustion of the pyrotechnic material against a workpiece, the nozzle means including fluid path means for guiding the fluid in a cookie cutter pattern against a workpiece at an angle outwardly of the zone of contact between the fluid and the workpiece.

2. A nozzle for a self contained torch which is used on a workpiece, comprising
   a base block having a centerline;
   a plurality of first fluid paths extending through said base block at an angle with respect to said centerline and terminating within said base block;
   a second fluid path extending through said base block and being in fluid communication with said first fluid paths for receiving fluid therefrom and conducting that fluid out of said base block, said second fluid path extending at an angle with respect to said centerline and directing fluid exiting therefrom at an angle to a workpiece surface located adjacent to said base block.

3. A nozzle for a self-contained torch which is used in conjunction with a workpiece, comprising;
   a base block having a centerline and one surface adapted to be located adjacent to a workpiece;
   a fluid path means extending through said base block at an angle to the centerline and to said block one surface for conducting fluid against the workpiece at an angle outwardly and away from a zone of contact between that fluid and the workpiece.

4. The nozzle defined in claim 3 wherein said fluid path means includes a plurality of ports which extend into said base block and a slot-like chamber which is fluidly connected to all of said ports.

5. The nozzle defined in claim 4 wherein said ports and said slot-like chamber extend at an angle of about thirty degrees with respect to the base block centerline.

6. The nozzle defined in claim 5 further including a plug-like means adjacent to said ports for guiding fluid in said slot-like chamber and for venting fluid rapidly through said base block in the event pressure of fluid entering said ports exceeds a predetermined value.

7. The nozzle defined in claim 6 wherein said ports have diameters and said slot-like chamber has a width as measured between said base block and said plug-like means with each of said port diameters being equal to said slot-like chamber width.

8. The nozzle defined in claim 3 wherein said fluid path means has a longitudinal extent and said base block is formed of graphite having a grain longitudinal direction extending in longitudinal direction of said fluid path means.

9. The nozzle defined in claim 3 further including safety means, said safety means including means for relieving overpressure conditions of fluid entering said ports and for permitting fluid to pass freely in either direction within said fluid path means.

10. A method of defining a large hole in a workpiece comprising steps of:
    causing cutting fluid to flow along a path having a hollow conical shape and forming a circular cutting zone upon intersecting a workpiece; and
    guiding the cutting fluid into contact with the workpiece to flow outwardly of the zone of contact.

11. The method defined in claim 10 wherein said cutting fluid includes high temperature, high pressure products of combustion.

12. The method defined in claim 11 further including a step of conducting fluid from a first path to a conical path.

13. The method defined in claim 12 including a step of providing a third flow path when pressure of fluid entering said first path exceeds a predetermined value.

14. The method defined in claim 13 including a step of flowing the fluid along a plurality of separate paths in said first path.

15. The method defined in claim 14 including a step of causing said fluid to expand from said first path prior to entering said conical path.

16. The method defined in claim 14 wherein the fluid flowing in the conical path forms a shape which is essentially continuous when it intersects the workpiece.

17. The method defined in claim 16 including a step of overlapping fluid exiting one of said separate paths with fluid exiting adjacent separate paths.

* * * * *